(12) United States Patent
Garcia

(10) Patent No.: US 11,519,145 B2
(45) Date of Patent: Dec. 6, 2022

(54) UTILITY VEHICLE TO REMOVE MATTER FROM SURFACE

(71) Applicant: Fabio Fajardo Garcia, Bronx, NY (US)

(72) Inventor: Fabio Fajardo Garcia, Bronx, NY (US)

(*) Notice: Subject to any disclaimer, the term of this patent is extended or adjusted under 35 U.S.C. 154(b) by 701 days.

(21) Appl. No.: 16/360,470

(22) Filed: Mar. 21, 2019

(65) Prior Publication Data
US 2019/0323189 A1 Oct. 24, 2019

Related U.S. Application Data

(60) Provisional application No. 62/661,853, filed on Apr. 24, 2018.

(51) Int. Cl.
| | | |
|---|---|---|
| E01H 1/08 | (2006.01) |
| E01H 5/10 | (2006.01) |
| E01H 5/04 | (2006.01) |
| E01H 1/10 | (2006.01) |
| E01H 5/07 | (2006.01) |
| B60P 1/60 | (2006.01) |

(52) U.S. Cl.
CPC ......... *E01H 1/0836* (2013.01); *E01H 1/0845* (2013.01); *E01H 1/108* (2013.01); *E01H 5/045* (2013.01); *E01H 5/07* (2013.01); *E01H 5/106* (2013.01); *B60P 1/60* (2013.01)

(58) Field of Classification Search
CPC ..... E01H 1/0836; E01H 1/0845; E01H 1/108; E01H 5/045; E01H 5/07; E01H 5/106; B60P 1/60
See application file for complete search history.

(56) References Cited

U.S. PATENT DOCUMENTS

| | | | | |
|---|---|---|---|---|
| 1,666,358 A | * | 4/1928 | Souhigian | E01H 5/07 37/238 |
| 1,742,968 A | * | 1/1930 | Polak | 126/343.5 R |
| 2,078,310 A | * | 4/1937 | Berres | E01H 5/076 37/248 |
| 2,498,144 A | * | 2/1950 | Thomas | E01H 5/07 414/553 |
| 3,304,632 A | * | 2/1967 | Kotlar | E01H 5/104 37/228 |
| 3,333,354 A | | 8/1967 | Kirshenblat | |
| 3,404,470 A | * | 10/1968 | Raiti | E01H 1/0845 37/228 |
| 3,406,424 A | * | 10/1968 | Rush | E01H 1/0845 15/340.3 |
| 3,474,483 A | * | 10/1969 | Heidland | E01H 1/0845 15/319 |

(Continued)

*Primary Examiner* — Gary S Hartmann
(74) *Attorney, Agent, or Firm* — Gearhart Law LLC

(57) ABSTRACT

A utility vehicle to remove a matter from a surface may include an articulated collector attached to a front section of the utility vehicle. The articulated collector is movable. The articulated collector is also configured to remove the matter from the surface. A matter container is also connected to the utility vehicle. The articulated container is also connected to the matter container. The matter container is configured to receive and hold the matter. Furthermore, an articulated depositor is connected to the matter container. The articulated depositor is configured to deposit the matter to a disposal site.

12 Claims, 4 Drawing Sheets

(56) References Cited

U.S. PATENT DOCUMENTS

| | | | | |
|---|---|---|---|---|
| 3,675,267 A * | 7/1972 | Klawitter | A47L 11/24 | |
| | | | 15/385 | |
| 3,803,732 A * | 4/1974 | Moreno | E01H 5/104 | |
| | | | 37/251 | |
| 4,164,820 A * | 8/1979 | Krickovich | E01H 5/104 | |
| | | | 15/340.3 | |
| 4,578,840 A * | 4/1986 | Pausch | E01H 1/0836 | |
| | | | 15/340.1 | |
| 5,787,613 A * | 8/1998 | Derome | E01H 5/104 | |
| | | | 126/343.5 R | |
| 5,953,837 A | 9/1999 | Clifford | | |
| 5,956,872 A | 9/1999 | Mavrianos | | |
| 6,305,105 B1 * | 10/2001 | Lowman | E01H 5/104 | |
| | | | 37/199 | |
| 6,904,708 B2 * | 6/2005 | Rogers | E01H 5/104 | |
| | | | 126/343.5 R | |
| 9,284,702 B2 * | 3/2016 | Lee | E01H 5/104 | |
| 9,290,899 B2 * | 3/2016 | Fonseca | E01H 5/104 | |
| 9,695,562 B2 * | 7/2017 | Lukaj | E01H 5/104 | |
| 9,732,489 B1 * | 8/2017 | Whitney | E01H 5/104 | |
| 10,006,182 B1 * | 6/2018 | Cho | E01H 5/104 | |
| D902,962 S * | 11/2020 | Juarez | D15/11 | |
| 2006/0045699 A1 * | 3/2006 | Peck | E01H 1/108 | |
| | | | 414/500 | |
| 2016/0369467 A1 | 12/2016 | Rogers | | |
| 2018/0010309 A1 * | 1/2018 | Gilbert | E01H 5/04 | |

\* cited by examiner

UTILITY VEHICLE TO REMOVE MATTER FROM SURFACE

CLAIM OF PRIORITY

This application claims priority to U.S. Application Ser. No. 62/661,853 filed on Apr. 24, 2018, the contents of which are herein incorporated by reference in its entirety.

FIELD OF THE EMBODIMENTS

The field of embodiments of the present invention related to a utility vehicle configured to remove a matter such as a debris from a surface such as a road.

BACKGROUND OF THE EMBODIMENTS

Manufacturers custom build motor vehicles to meet a variety of the demand related service scenarios. Accessway cleaning is a service that is met by custom build motor vehicles. Road access is an important resource to maintain clear of debris. Debris on roadways may restrict and/or prevent continued transportation of goods and services.

To maintain uninterrupted commerce of goods and services, variety of cleaning vehicles are used to provide cleaning related services and maintain roadways clear of debris. Commercial cleaning vehicles are customized and purpose build to provide the cleaning services. As such, a cleaning vehicle may necessitate substantial up front cost resulting from customization necessary to provide the cleaning service.

Embodiments address cost and other issues that arise from use of customized vehicles to maintain an accessway clear of debris.

SUMMARY OF THE EMBODIMENTS

The present invention and its embodiments relate to a utility vehicle configured to remove a matter from a surface. In an example embodiment of the present invention, the utility vehicle may include an articulated collector attached to a front section of the utility vehicle. The articulated collector may be movable. The articulated collector may also be configured to remove the matter from the surface. In addition, a matter container may be connected to the utility vehicle. The articulated connector may also be connected to the matter container. The matter container may be configured to receive and hold the matter. Furthermore, an articulated depositor may be connected to the matter container. The articulated depositor may be configured to deposit the matter to a disposal site.

In another embodiment of the present invention, a utility truck to remove a non-hazardous road debris from a road is described. The utility truck may include an articulated collector attached to a front section of the utility truck. The articulated collector may be movable. The articulated collector may also be configured to remove the road debris from the road. A trailer may also be connected to the utility truck and the articulated collector. The trailer may be configured to receive and hold the road debris. Furthermore, an articulated depositor may be connected to the trailer. The articulated depositor may be configured to deposit the road debris to a disposal site.

In yet another embodiment of the present invention, a method of removing a non-hazardous road debris from a road is described. The method includes, positioning an articulated collector, attached to a trailer of a utility truck, over the road debris on the road. The articulated collector is attached to a front section of the utility truck. A suction mechanism is started to remove the road debris from the road. The road debris is routed to the trailer. Furthermore, the road debris is deposited into the trailer.

It is an object of the embodiment of the present invention to provide a utility vehicle to remove a matter from a surface.

It is another object of the embodiment of the present invention to provide an articulated collector to remove the matter from the surface using a suction mechanism.

It is yet another object of the embodiment of the present invention to move the articulated collector laterally and linearly to position an aperture over the matter on the surface.

It is yet another object of the embodiment of the present invention to route the matter to matter container.

It is yet another object of the embodiment of the present invention to remove the matter from the matter container through an articulated depositor.

It is yet another object of the embodiment of the present invention to rotate joints of the articulated depositor to position an output component over a disposal site.

These and other features, aspects and advantages of the present invention will become better understood with reference to the following drawings, description and claims.

DESCRIPTION OF THE PREFERRED EMBODIMENTS

Figure 1:
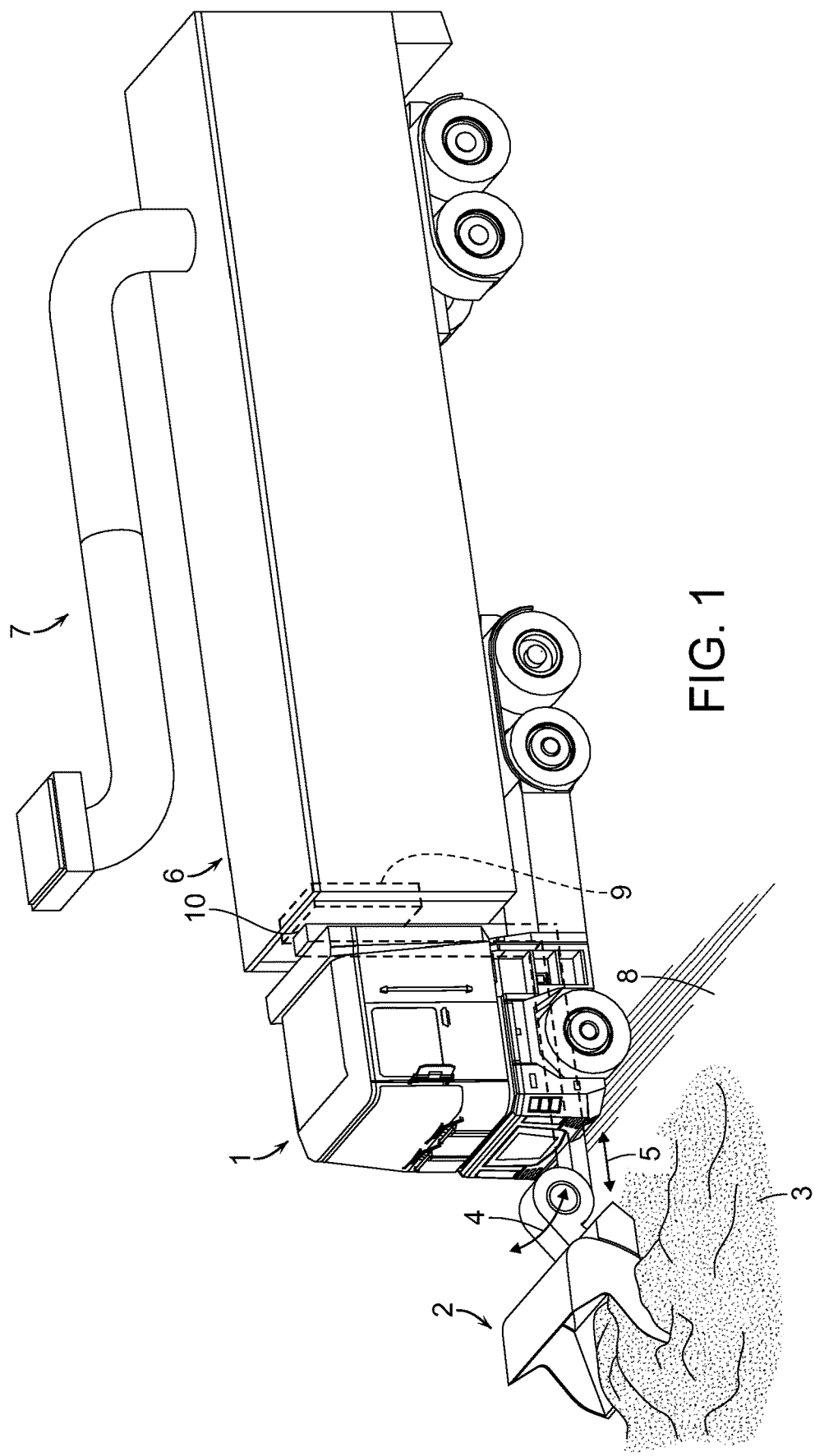
FIG. 1 shows a front facing view of an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a front facing view of a utility vehicle 1. An example of the utility vehicle 1 may include a truck. In an example scenario, the utility vehicle 1 may be augmented with an attachable apparatus such as an articulated collector 2. The articulated collector 2 may be placed in front of the utility vehicle 1, above front wheels of the utility vehicle 1, and/or under a front door of the utility vehicle 1 in front of a matter container 6, among other positions. The articulated collector 2 may be configured to remove a matter 3 from a surface 8. An example of the matter 3 may include a snow pile, a road debris, a water stream (from rain, and/or flood, among others), and/or a waste, among others. The articulated connector 2 may include a heating component to melt snow and/or ice on the surface 8.

The articulated collector 2 may be attachable to a front section of the utility vehicle 1. For example, the articulated collector 2 may be mounted to a chassis and/or a chassis support structure associated with the front section of the utility vehicle 1. The articulated collector 2 may also be moveable in a lateral direction 4. The mobility in the lateral direction 4 may allow positioning of an aperture of the articulated collector 2 over the matter 3 on the surface 8. Suction based mechanism may be used to move the matter 3 through the aperture of the articulated collector 2. As such, the matter 3 may be removed from the surface 8.

The articulated collector 2 may be installed on a central axis in relation to the utility vehicle 1. The articulated collector 2 may include three components that may be installed and/or replaced based on work scenario associated with a removal of the matter 3. An example of the three components may include a filter and/or a grill, among others.

Furthermore, the articulated collector 2 may be moved in a linear direction 5 to elongate or retract the articulated collector 2. The linear direction 5 based movement may be used by an operator to position the articulated collector 2 over the matter 3. The operator may manually move the articulated collector 2 in the lateral direction 4 and/or the linear direction 5 to manually position the aperture of the articulated collector 2 over the matter 3 while the utility vehicle 1 is in motion or at rest. Alternatively, an automated mechanism may automatically move the articulated collector 2 in the lateral direction 4 and/or the linear direction 5 to automatically position the aperture of the articulated collector 2 over the matter 3 while the utility vehicle 1 is in motion or at rest. The automated mechanism may include components such as camera(s), laser(s), and/or radar(s) to recognize the matter 3 on the surface 8 and move the aperture of the articulated collector 2 over the matter 3. The aperture may be automatically positioned to remove the matter 3 from the surface 8 while the utility vehicle 1 is in motion or at rest.

The articulated collector 2 may route the matter 3 to a matter container 6. The matter container 6 may include a tank or a trailer, among others latched (or attached) to a rear section of the utility vehicle 1. The matter container 6 may also be configured to receive the matter 3 from the articulated collector 2. The articulated collector 2 may be connected to the matter container 6 with a pipe routed underneath or through a chassis of the utility vehicle 1. The pipe may connect to a pumping mechanism 9 positioned in a front section of the matter container 6. The pumping mechanism 9 may include components such as a pump, a flow motor, and/or a refrigeration unit to provide the suction mechanism to route the matter 3 to the matter container 6 and to provide refrigeration in relation to a storage of the matter 3. The pumping mechanism 9 may deposit the matter into the matter container 6 through an aperture 10. In another example scenario, one or more heating components may be integrated with the articulated component 2, the utility vehicle 1, and/or the matter container 6. The one or more heaters may be turned on and used to maintain the picked up and/or stored matter 3 in a liquid state.

The matter container 6 may be configured to store nonhazardous material. As such, the articulated collector 2 may include a filter and/or a grill, among others. The filter and/or grill may prevent collection of the matter 3 such as solid item(s). The solid item(s) in excess of a predetermined size may fail to pass through the filter and/or the grill.

The matter container 6 may also include an articulated depositor 7. The articulated depositor 7 may be configured to remove the matter 3 from the matter container 6. The articulated depositor 7 may deposit the matter 3 to a disposal site (such as a waste management site and/or container, roadway, among others). The articulated depositor 7 may be moveable to the left, right, up and/or down. The articulated depositor 7 may deposit or spray the material 3 to the deposit site.

A number of control components (boxes) may be installed in various locations on the utility vehicle 1 to manage the articulated collector 2 and the articulated depositor 7. A first control component may be installed inside a cabin of the utility vehicle 1 to manage the articulated collector 2 and/or the articulated depositor 7. A second control component may be installed in an external service of the cabin to allow for control and management of the articulated collector 2 and/or the articulated depositor 7. A third control component may be a portable management component to control and manage the articulated collector 2 and/or the articulated depositor 7.

The utility vehicle 1 may also include a generator to power components associated with routing the matter 3 from the surface 8 to the matter container 6. Furthermore, the utility vehicle 1 may also include a turbine to route the matter 3 from the surface 8 to the matter container 6.

Figure 2:
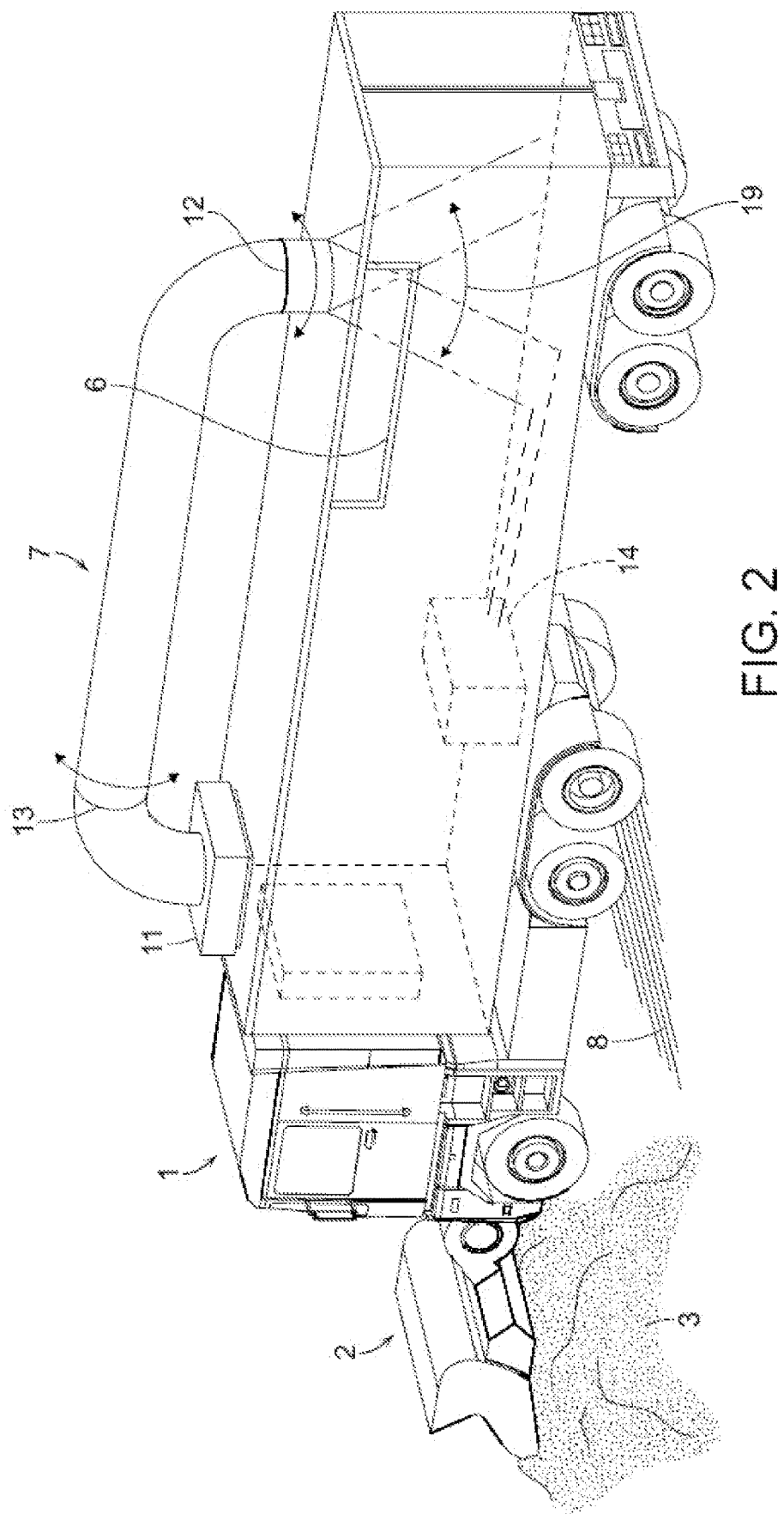
FIG. 2 shows a rear facing view of an embodiment of the present invention.

FIG. 2 shows a rear facing view of the utility vehicle 1. The matter container 7 may receive the matter 3 (removed from the surface 8 by the articulated collector 2). The pumping mechanism 9 may route the matter 3 through the aperture 10 to deposit the matter 3 into the matter container 6.

The matter container 6 may include the articulated depositor 7 to aid in removal of the matter 3 from the matter container 6. The articulated depositor 7 may include an internal component 14 that is situated at a bottom section of the matter container 6. A positioning of the internal component 14 may allow a pumping mechanism to remove an entirety of a content of the matter container 6 (through the articulated depositor 7). The internal component 14 may also be movable 19 to position an inlet of the internal component 14 in different locations within the matter container 6. The content of the matter container 6 may include the matter 3. The internal component 14 may also include extensions attachable to the inlet (such as a filter) to control and manage a flow of the matter 3 out of the matter container 6.

The articulated depositor 7 may also include a first joint 12 and a second joint 13. The first and second joints (12 and 13) may be rotatable. Rotations of the first and second joints (12 and 13) may allow an operator to position an output component 11 over a disposal site and/or a disposal container. Furthermore, the operator may be able to extend and retract the articulated depositor 7 to position the output component 11 over the disposal site and/or disposal container. Upon positioning the output component 11, the operator may enable the pumping mechanism to remove the content of the matter container 6. A content gauge may provide a visual indicator of a fullness level of the matter container 6. Furthermore, a window on the matter container 6 may allow the operator to view the content of the matter container 6. A door on the matter container 6 may allow ingress into the matter container 6 and provide access to the content within the matter container 6.

A removal action associated with the content of the matter container 6 may also be automated. An automated scheme may position the output component 11 over the disposal site and/or the disposal container in response to a trigger event. The trigger event may include a detection of the matter container 6 in an adjacent position in relation to the disposal site and/or container. Subsequently, the content of the matter container 6 may automatically be deposited to the matter site and/or container.

Figure 3:
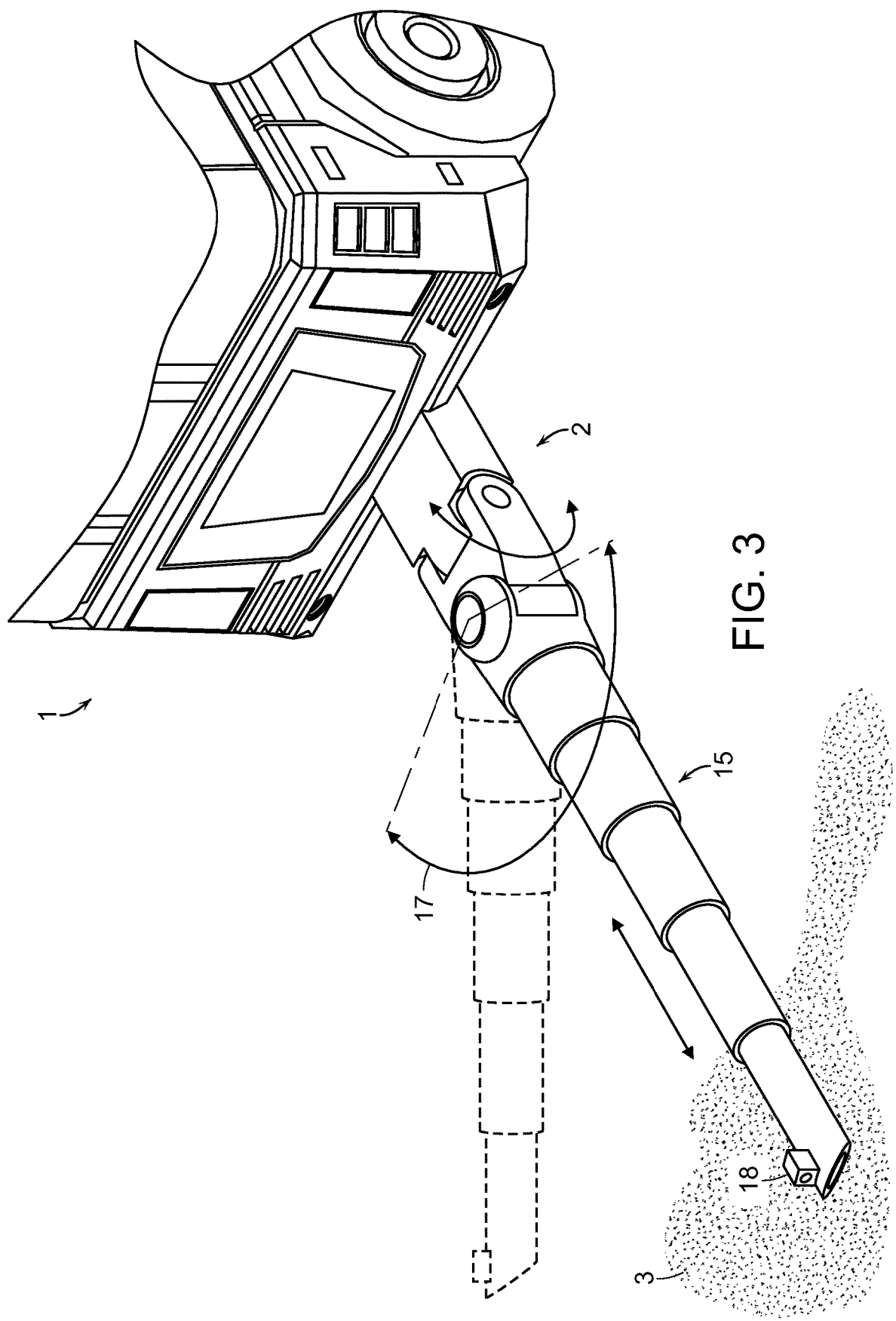
FIG. 3 shows an alternative embodiment of the present invention.

FIG. 3 shows an alternative example of the articulated collector 2. In an example scenario, the articulated collector 2 may be attached to a pipe 15. Alternatively, the pipe 15 may be attached directly to the matter container (without the articulated collector 2). The pipe 15 may include a joint 17 (and other joints) to aid in positioning an inlet of the pipe to the matter 3. The joint 17 may be rotated and the pipe 15 may be retracted or extended to position the inlet of the pipe over the matter 3. The matter 3 may be removed from a surface or other environment through a suction mechanism. The matter 3 may be routed through the pipe 15 to the matter container.

The pipe 15 may also include a camera 18. The camera 18 may provide an image and/or a video stream facing a front direction from the inlet of the pipe 15 to aid in viewing the matter 3. As such, an operator of the pipe may start and stop the suction mechanism to allow or reject a collection of the matter 3.

Figure 4:
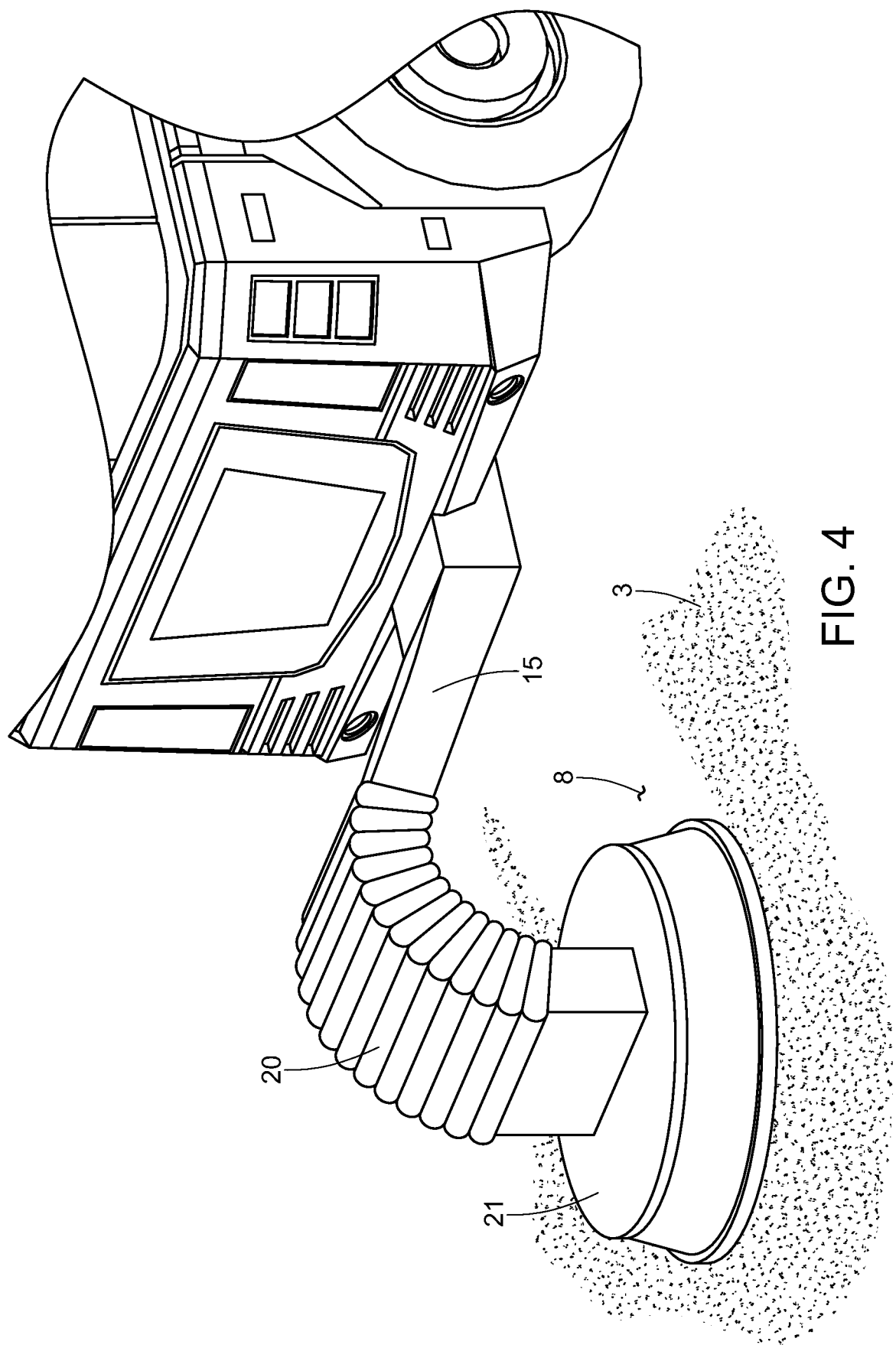
FIG. 4 shows another alternative embodiment of the present invention.

FIG. 4 shows another alternative example of the articulated collector 2. In an example scenario, the articulated collector may be attached to a pipe 15 using a connector 20. The connector 20 may be bendable to position the articulated collector 2 over a surface 8. The articulated collector 2 may also include a filter 21 that may screen material(s) from the matter 3 as the matter 3 is collected from the surface 8. An example of the matter 3 to be picked up from the surface 8 by the articulated collector 2 may include liquid material that is non-hazardous such as rain water, among others.

A method of removing a non-hazardous road debris from a road is also described. The method includes, positioning an articulated collector, attached to a trailer of a utility truck, over the road debris on the road. The articulated collector is attached to a front section of the utility truck. A suction mechanism is started to remove the road debris from the road. The road debris is routed to the trailer. Furthermore, the road debris is deposited into the trailer.

In addition to the foregoing, other objects, features, aspects and advantages of the present invention will be better comprehended through a careful reading of a detailed description provided herein below with appropriate reference to the accompanying drawings.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A utility vehicle to remove a matter from a surface, comprising:
an articulated collector attached to a front section of the utility vehicle,
wherein the articulated collector is movable, and
wherein the articulated collector is configured to remove the matter from the surface;
a matter container coupled to the utility vehicle,
wherein the articulated collector is connected to the matter container via piping positioned along an underside of the utility vehicle, and
wherein the matter container is configured to receive and hold the matter; and
an articulated depositor coupled to a top side of the matter container,
wherein the articulated depositor is configured to deposit the matter to a disposal site,
wherein the articulated depositor is coupled to an internal component disposed on an interior bottom surface of the trailer, and
wherein the internal component is repositionable and is configured to provide pumping of the road debris from the trailer via the articulated depositor.

2. The utility vehicle of claim 1, wherein the utility vehicle includes a truck.

3. The utility vehicle of claim 1, wherein the matter container includes a tank or a trailer.

4. The utility vehicle of claim 1, wherein the articulated collector includes a receiving aperture.

5. The utility vehicle of claim 4, wherein the matter is removable from the surface by suctioning through the receiving aperture.

6. The utility vehicle of claim 4, wherein the articulated collector is manually movable to position the receiving aperture on top of the matter by an operator for a removal of the matter from the surface.

7. The utility vehicle of claim 4, wherein the articulated collector is automatically movable by a matter detection mechanism to position the receiving aperture on top of the matter for a removal of the matter from the surface.

8. The utility vehicle of claim 1, wherein the articulated collector includes a filter.

9. The utility vehicle of claim 1, wherein the container includes a door to provide an access to the matter held within the container.

10. The utility vehicle of claim 1, wherein the articulated collector includes an internal camera.

11. The utility vehicle of claim 10, wherein the internal camera is configured to provide a video of the matter as the matter is collected from the surface and is routed through the articulated collector.

12. A utility truck to remove a non-hazardous road debris from a road, comprising:
an articulated collector attached to a front section of the utility truck,
wherein the articulated collector is movable, and
wherein the articulated collector is configured to remove the road debris from the road;
a trailer coupled to the articulated collector via piping positioned along an underside of the utility vehicle,
wherein the trailer is configured to receive and hold the road debris; and
an articulated depositor coupled to a top side of the trailer,
wherein the articulated depositor is coupled to an internal component disposed on an interior bottom surface of the trailer,
wherein the internal component is repositionable and is configured to provide pumping of the road debris from the trailer via the articulated depositor.

* * * * *